US005776362A

United States Patent [19]
Sato et al.

[11] Patent Number: 5,776,362
[45] Date of Patent: Jul. 7, 1998

[54] SLUDGE DEHYDRATING AGENT

[75] Inventors: Shigeru Sato; Hisao Ohshimizu, both of Tokyo; Shinobu Kawaguchi, Kyoto, all of Japan

[73] Assignees: Kurita Water Industries Ltd., Tokyo; Sanyo Chemical Industries Ltd., Kyoto, both of Japan

[21] Appl. No.: 290,986

[22] PCT Filed: Jun. 30, 1993

[86] PCT No.: PCT/JP93/00904

§ 371 Date: Aug. 23, 1994

§ 102(e) Date: Aug. 23, 1994

[87] PCT Pub. No.: WO94/01370

PCT Pub. Date: Jan. 20, 1994

[30] Foreign Application Priority Data

Jul. 4, 1992 [JP] Japan ................................. 4-200624

[51] Int. Cl.⁶ ..................................................... G02F 11/14
[52] U.S. Cl. ........................... 252/194; 210/609; 210/734; 210/735; 525/78; 525/293; 525/296; 525/299; 525/329.3; 525/329.4
[58] Field of Search ........................ 210/609, 734, 210/735; 252/194; 525/78, 293, 296, 299, 329.3, 329.4

[56] References Cited

U.S. PATENT DOCUMENTS

| 3,658,474 | 4/1972 | Rothwell | 423/69 |
| 4,396,513 | 8/1983 | Halderman | 120/734 |
| 4,721,574 | 1/1988 | McGrow | 210/734 |
| 4,966,712 | 10/1990 | Nishibayashi et al. | 210/705 |
| 5,006,263 | 4/1991 | Robinson et al. | 210/728 |
| 5,104,552 | 4/1992 | Cicchiello et al. | 210/727 |
| 5,380,444 | 1/1995 | Ryan et al. | 210/734 |
| 5,405,554 | 4/1995 | Neff et al. | 252/309 |

FOREIGN PATENT DOCUMENTS

| 2235314 | 3/1957 | Australia . |
| 640426 | 4/1962 | Canada . |
| 56-118798 | 9/1981 | Japan . |
| 59-92099 | 5/1984 | Japan . |
| 62-49918 | 3/1987 | Japan . |
| 62-289300 | 12/1987 | Japan . |
| 2-78499 | 3/1990 | Japan . |
| 1341972 | 2/1973 | United Kingdom . |
| 1373034 | 11/1974 | United Kingdom . |

OTHER PUBLICATIONS

JP 02180700 (Jul. 13, 1990) Chemical Abstrac 114:29584.
JP 03189000 (Aug. 16, 1991) Chemical Abstract 116:45760.
JP 50-96460 (Kurita Water Ind Lt.) 31 Jul. 1973 See Derwent Asbtract 29687Y/17 Only.

JP 0121557 (Toa Gosei Chem Ind Ltd) 20 Sep. 1979 Derwent Abstract 79777B/44 Only.

JP 0107992 (Mitsubishi Chem Ind KK) 24 Oct. 1979.

JP 012900200A (Kurita Water Ind KK) 7 Oct. 1985 See Derwent 85-206070/34.

JP 1200897 (Kurita Water Ind KK) 05 Sep. 1986 See Derwent 86-275536/42 Only.

JP 2205112 (Dia Flock KK) 09 Sep. 1987. See 87-2948975/42 Only.

JP 3030496 (Kurita Water Ind KK) 22 Mar. 1978. See Derwent Abstract 32720A/18 Only.

JP 4007100A (Kurita Water Ind KK) 10 Jan. 1992. See Derwent Abstract 92-061492/08 Only.

JP 49-53576 (Mitsubishi Petroleum Co.) 25 May 1974. See Derwent 0629W/04 Only.

GB 1388399 (Imperial Chem Ind Ltd) 26 Mar. 1975. See Derwent Asbtract 2145W/13 And Patent.

*Primary Examiner*—Sharon Gibson
*Assistant Examiner*—Valerie Fee
*Attorney, Agent, or Firm*—Birch, Stewart, Kolasch & Birch, LLP

[57] ABSTRACT

A sludge dehydrating agent which is excellent in storage stability and prevented from becoming water-insoluble during storage and hence can be distributed in the market securely by solving the problem of the conventional dehydrating agents comprising amphoteric polymers that they undergo deterioration and become water-insoluble when stored for long, thus becoming substantially unusable. This dehydrating agent comprises a copolymer composed of cationic vinyl monomer units, vinylic carboxylic acid monomer units and nonionic vinyl monomer units and a salt of a group IIA metal of the periodic table. Preferable examples of the vinylic carboxylic acid monomer include acrylic, methacrylic and crotonic acids, while those of the nonionic vinyl monomer include acrylamide and methacrylamide. The metal salts usable herein include those of mineral acids and organic carboxylic acids, and preferable mineral acid salts include calcium chloride, magnesium chloride and magnesium sulfate. Preferably, the amount of the cationic vinyl monomer ranges from 10 to 60 mole %, while that of the vinylic carboxylic acid monomer from 10 to 45 mole %. Preferably, the molar ratio of the cationic vinyl monomer to the vinylic carboxylic acid monomer ranges from 0.3 to 3.0, while that of the metal salt to the carboxylic acid monomer from 0.2 to 2.0. The dehydrating agent may further contain an inorganic coagulant.

16 Claims, No Drawings

SLUDGE DEHYDRATING AGENT

This application is a 371 of PCT/JP93/00904 filed Jun. 30, 1993.

TECHNICAL FIELD

The present invention relates to a sludge dehydrating agent comprising amphoteric polymers, and more particularly to a sludge dehydrating agent comprising amphoteric polymers, which is excellent in storage stability undergoing little deterioration with time.

BACKGROUND ART

Previously dehydrating agents comprising cationic polymers have been known as sludge dehydrating agents. However, conventional dehydrating agents are becoming unsatisfactory in performance because of the recent worsening and diversification in sludge properties and, therefore, an improvement in the performance thereof has been sought. In this connection, sludge dehydrating agents having strong aggregation force and comprising amphoteric polymers have been proposed which are superior in recovery of suspended substances, water content of cake and release of cake from filter cloth. However, conventional sludge dehydrating agents comprising amphoteric polymers had a disadvantage that they undergo deterioration during storage and become water-insoluble while being used. In order to solve this problem. JP-A-3-293100 proposed a sludge dehydrating agent having an improved storage stability by further adding a specific cationic monomer onto an amphoteric polymer comprising a specific cationic monomer, an anionic monomer and a nonionic monomer. With this improved agent, however, the shelf life is not long enough and hence cannot be distributed securely in the market.

The object of the present invention is to provide a sludge dehydrating agent which is excellent in storage stability without becoming water-insoluble during storage by the improvement of conventional sludge dehydrating agents comprising amphoteric polymers.

DISCLOSURE OF INVENTION

In order to attain the object described above, the present invention uses a sludge dehydrating agent comprising a copolymer composed of cationic vinyl monomer units, vinylic carboxylic acid monomer units and nonionic vinyl monomer units and a salt of a group IIA metal of the periodic table.

In the sludge dehydrating agent of the invention it is preferable to use as the cationic vinyl monomer the following compound expressed by the general formula (1).

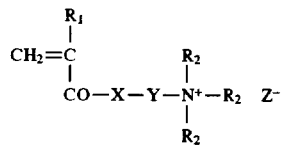

wherein $R_1$ denotes a hydrogen atom or a methyl group, $R_2$ denotes a hydrogen atom, a methyl group an ethyl group or a benzyl group, X denotes O or NH Y denotes $CH_2$—$CH_2$, $CH_2$—$CH_2$—$CH_2$ or $CH_2$—$CH$—(OH)—$CH_2$, Z denotes a chlorine atom, a bromine atom, an iodine atom, a sulfate group, or a methyl sulfate group.

Preferable examples of the vinylic carboxylic acid monomer include acrylic acid, methacrylic acid or crotonic acid, while those of the nonionic vinyl monomer include acrylamide or methacrylamide. The metal salts used may be those of mineral acid or organic carboxylic acids, and preferable mineral acid salts include calcium chloride, magnesium chloride or magnesium sulfate.

In the sludge dehydrating agent described above the amount of the cationic vinyl monomer is preferably in the range from 10 to 60 mole %, while the amount of the vinylic carboxylic acid monomer is preferably in the range from 10 to 45 mole %. The molar ratio of the cationic vinyl monomer to the vinylic carboxylic acid monomer is preferably in the range from 0.3 to 3.0, and the content of the salt of a group IIA metal based on the molar ratio to the vinylic carboxylic acid monomer may be preferably in the range from 0.2 to 2.0. Further, an inorganic coagulant can be added to the sludge dehydrating agent of the invention.

THE BEST MODE FOR CARRYING OUT THE INVENTION

The sludge dehydrating agent of the invention is characterized in that a sludge dehydrating agent which comprises a copolymer having cationic vinyl monomer units, vinylic carboxylic acid monomer units and nonionic vinyl monomer units, which will be hereafter designated "Copolymer A", is added with a salt of a group IIA metal of the periodic table.

First, the compounds used in the sludge dehydrating agent of the invention will be explained.

Typical examples of the cationic vinyl monomer are (meth)acryloyloxy(hydroxy)alkyl quaternary or tertiary ammonium salts and (meth)acrylamide(hydroxy)alkyl quaternary or tertiary ammonium salts. Examples of (meth)acryloyloxy(hydroxy)alkyl quaternary or tertiary ammonium salts are acryloyloxyethyltrimethylammoniumchloride, acryloyloxyethyldimethylbenzylammonium chloride, methacryloyloxytrimethylammonium chloride, methacryloyloxyhydroxypropyltrimethylammonium chloride, methacryloyloxyethyldiethylmethylammonium methosulfate, methacryloyloxyethyltrimethylammonium bromide, methacryloylethyltrimethylammonium iodide, and methacryloyloxyethyldimethyl ammonium chloride. Examples of (meth)acrylamide(hydroxy)alkyl quaternary or tertiary ammonium salts are acrylamidepropyltrimethylammonium chloride, acrylamidepropyldimethylammonium sulfate, and methacrylamidepropyltrimethylammonium sulfate. Among these compounds, cationic vinyl-monomers encompassed by the general formula (1) provided above are preferably used.

Typical examples of the vinylic carboxylic acid monomers are acrylic acid, methacrylic acid, crotonic acid, cinnamic acid, itaconic acid, maleic acid, and fumaric acid. Preferable among these are acrylic acid, methacrylic acid and crotonic acid.

Examples of the nonionic vinyl monomers are water soluble nonionic monomers, preferably acrylamide and methacrylamide. A small amount of a hydrophobic nonionic vinyl monomer may be used in combination, unless Copolymer A becomes insoluble in water.

In Copolymer A the amount of the cationic vinyl monomer is usually in the range from 10 to 60 mole %, preferably from 20 to 45 mole %. When the amount of the cationic vinyl monomer is smaller than 10%, water content of the cake becomes not sufficient in using the sludge dehydrating agent of the invention; while, when the amount thereof exceeds 60 mole %, strong aggregation force which is characteristic of an amphoteric polymer is not obtained. The amount of the vinylic carboxylic acid monomer in Copolymer A is usually in the range from 10 to 45 mole %, preferably from 20 to 40 mole %. When the amount of the vinylic carboxylic acid monomer is smaller than 10%, strong aggregation force which is characteristic of an amphoteric polymer is not obtained in using the sludge dehydrating agent of the invention, and on the other side, when the amount thereof exceeds 45 mole %, water content of the cake becomes not sufficient.

The molar ratio of the cationic vinyl monomer to the vinylic carboxylic acid monomer in Copolymer A is usually in the range from 0.3 to 3.0 based on the amount of the vinylic carboxylic acid monomer to the cationic vinyl monomer, preferably from 0.5 to 2.0. When the ratio is smaller than 0.3, water content and releasing ability from filter cloth of the cake are insufficient in using the sludge dehydrating agent of the invention and, when the molar ratio exceeds 3.0, strong aggregation force which is characteristic of an amphoteric polymer is not obtained.

The amount of the nonionic vinyl polymer in Copolymer A is usually in the range from 5 to 80 mole %, preferably from 10 to 60 mole %. When the amount of the nonionic vinyl monomer is smaller than 5 mole %, strong flocculating power which is characteristic of an amphoteric polymer is not obtained in using the sludge dehydrating agent of the invention and, when the amount thereof exceeds 80%, water content of the cake becomes insufficient.

Examples of the salts of group IIA metals include mineral acid salts of group IIA metals, such as calcium chloride, magnesium chloride, magnesium sulfate, calcium nitrate and strontium chloride, and organic acid salts of group IIA metals, such as calcium acetate and magnesium lactate. Preferable among these salts are calcium chloride, magnesium chloride and magnesium sulfate.

The amount of the salts of group IIA metals is in the range from 0.2 to 2.0 by the molar ratio of the salt to the vinylic carboxylic acid monomer, preferably from 0.3 to 1.0. When the molar ratio of the salt of a group IIA metal to the vinylic carboxylic acid monomer is smaller than 0.2, long-term storage stability of the sludge dehydrating agent is not sufficient, while the molar ratio exceeding 2.0 is not preferable because of the decrease in the amount of active ingredients of the sludge dehydrating agent.

The intrinsic viscosity of the sludge dehydrating agent of the invention as measured in a 1N aqueous solution of $NaNO_3$ at 30° C. is not less than 3.0 dl/g, preferably not less than 4.0 dl/g.. When the intrinsic viscosity is smaller than 3.0 dl/g, the flocculating force may not be sufficient, and therefore, some trouble in dehydration occurs in using the sludge dehydrating agent of the invention.

In the following the process of preparing the sludge dehydrating agent of the invention will be explained in detail. In the preparation of the sludge dehydrating agent of the invention any of the known methods such as aqueous solution polymerization, emulsion polymerization and suspension polymerization can be employed. For example, in case of carrying out an aqueous solution polymerization, a polymerization catalyst is added to an aqueous solution of monomers of the concentration of 10 to 80% by weight, contained in a reactor which is purged of air by passage of an inert gas, and then the monomers are polymerized at 20° to 100° C. for a few hours. Examples of the polymerization catalyst used are persulfates such as ammonium persulfate and potassium persulfate, organic peroxides such as benzoyl peroxide, azoic compounds such as 2.2'azobis (amidinopropane) hydrochloride and azobiscyanovaleric acid, and redox catalyst comprising combinations of peroxides such as hydrogen peroxide and potassium peroxide with reducing agents such as sodium bisulfite and ferrous sulfate.

More particularly, an ordinary polymerization may be carried out after dissolving preliminarily a salt of a group IIA metal or an aqueous solution thereof into an aqueous solution containing a certain amount of a cationic vinyl monomer, a vinylic carboxylic acid monomer and a nonionic vinyl monomer. Another method of carrying out the polymerization is that, into an aqueous solution containing a cationic vinyl monomer, a vinylic carboxylic acid monomer and a nonionic vinyl monomer is admixed a salt of a group IIA metal or an aqueous solution thereof, while the polymerization reaction of the monomers is proceeding or after the polymerization reaction has been completed. Still another method which can be taken is that the amphoteric polymer obtained by the polymerization of the above-mentioned monomers in an aqueous solution is dried and powdered, and impregnated thereafter with an aqueous solution of a salt of a group IIA metal.

The sludge dehydrating agent of the invention can be used independently or in combination with an inorganic coagulant such as polyaluminum chloride and ferric chloride. These inorganic coagulant agents can be added to the sludge either before or after the sludge dehydrating agent is applied to the sludge.

The dosage of the sludge dehydrating agent of the invention to be added to the sludge is usually from 0.2 to 5% by weight based on the dry solids content of the sludge, preferably from 0.4 to 1.5% by weight. When the dosage is smaller than 0.2% by weight based on the dry solids content, the recovery of the suspended materials are not sufficient, while the dosage of more than 5% by weight brings about an economic disadvantage.

In applying the sludge dehydrating agent of the invention, it can be added to the sludge either directly or after being admixed with water and dispersed, thereby forming an aqueous solution. The sludge dehydrating agent is added to the sludge, stirred and mixed thereafter to form flocs. The flocs obtained are dehydrated by a dehydrator such as a belt press dehydrator.

The invention will be explained more fully by referring to the following description of the examples and the comparative examples. However, it is to be understood that the invention is not intended to be limited to the specific embodiments of the examples.

EXAMPLE 1

An aqueous solution was prepared by mixing 0.30 mole of acryloyloxyethyltrimethylammonium chloride, 0.05 mole of methacryloyloxyethyltrimethylammonium chloride, 0.30 mole of acrylic acid, 0.35 mole of acrylamide, 0.09 mole of calcium chloride and 130 grams of water and, after purging the air by the passage of nitrogen, the solution was poured into a petridish of 30 cm internal diameter and 5 cm depth Then 0.1 gram of ammonium persulfate was added to the solution and it was polymerized by keeping the temperature between 40° and 50° C. The polymerization was started immediately and completed in about one hour. The polymer obtained was taken out, chopped into pieces and, after being dried at 100° C. in an oven until the solid content reached 90%, pulverized to obtain a powdery sludge dehydrating agent of the invention, which will be hereafter designated C-1.

The sludge dehydrating agent obtained was immediately stored in a thermostatic chamber kept at 40° C., and was applied for evaluation of the storage stability at three months, six months and nine months after starting the storage. The results of the evaluation are tabulated in Table 1. The evaluation of the storage stability was carried out by adding one gram of the sludge dehydrating agent sample carefully, into a 500 ml beaker containing 500 grams of distilled water by stirring with a jar tester, not to flocculate the sample, followed by stirring for two hours, and observing the solubility of the sample thereafter.

EXAMPLE 2

An aqueous solution was prepared by mixing 0.30 mole of acryloyloxyethyltrimethylammonium chloride, 0.05 mole of methacryloyloxyethyltrimethylammonium chloride, 0.30 mole of acrylic acid, 0.35 mole of acrylamide, 0.30 mole of calcium chloride and 130 grams of water, followed by carrying out the same process as described in Example 1, to obtain the powdery sludge dehydrating agent of the invention, hereafter called C-2.

The sludge dehydrating agent obtained was evaluated by the same method as in Example 1. The results are tabulated in Table 1.

EXAMPLE 3

An aqueous solution was prepared by mixing 0.35 mole of acryloyloxyethyltrimethylammonium chloride, 0.30 mole of acrylic acid, 0.35 mole of acrylamide, 0.15 mole of calcium chloride and 130 grams of water, followed by the same procedure as in Example 1, the powdery sludge dehydrating agent of the invention, hereafter called C-3, was obtained.

The sludge dehydrating agent obtained was evaluated by the same method as in Example 1. The results are tabulated in Table 1.

EXAMPLE 4

An aqueous solution was prepared by mixing 0.10 mole of acryloyloxyethyltrimethylammonium chloride, 0.20 mole of acrylamidepropyltrimethylammonium chloride, 0.30 mole of acrylic acid, 0.35 mole of acrylamide, 0.15 mole of calcium chloride and 130 grams of water, followed by the same procedure as in Example 1, the powdery sludge dehydrating agent of the invention, hereafter called C-4, was obtained.

The sludge dehydrating agent obtained was evaluated by the same method as in Example 1. The results are tabulated in Table 1.

EXAMPLE 5

An aqueous solution was prepared by mixing 0.30 mole of acryloyloxyethyltrimethylammonium chloride, 0.05 mole of methacryloyloxyethyltrimethylammonium chloride, 0.30 mole of acrylic acid, 0.35 mole of acrylamide, 0.30 mole of magnesium sulfate and 130 grams of water, followed by the same procedure as in Example 1, the powdery sludge dehydrating agent of the invention, hereafter called C-5, was obtained.

The sludge dehydrating agent obtained was evaluated by the same method as in Example 1. The results are tabulated in Table 1.

An aqueous solution was prepared by mixing 0.35 mole of methacryloyloxyethyltrimethylammonium methyl sulfate, 0.30 mole of acrylic acid, 0.35 mole of acrylamide, 0.30 mole of calcium chloride and 130 grams of water, followed by the same procedure as in Example 1, the powdery sludge dehydrating agent of the invention, hereafter called C-6, was obtained.

The sludge dehydrating agent obtained was evaluated by the same method as in Example 1. The results are tabulated in Table 1.

COMPARATIVE EXAMPLE 1

An aqueous solution was prepared by mixing 0.30 mole of acryloyloxyethyltrimethylammonium chloride, 0.05 mole of methacryloyloxyethyltrimethylammonium chloride, 0.30 mole of acrylic acid, 0.35 mole of acrylamide and 130 grams of water, followed by the same procedure as in Example 1, a powdery sludge dehydrating agent, hereafter called C-7, was obtained.

The sludge dehydrating agent obtained was evaluated by the same method as in Example 1. The results are tabulated in Table 1.

COMPARATIVE EXAMPLE 2

An aqueous solution was prepared by mixing 0.35 mole of acryloyloxyethyltrimethylammonium chloride, 0.30 mole of acrylic acid, 0.35 mole of acrylamide and 130 grams of water, followed by the same procedure as in Example 1, a powdery sludge dehydrating agent, hereafter called C-8, was obtained.

The sludge dehydrating agent obtained was evaluated by the same method as in Example 1. The results are tabulated in Table 1.

COMPARATIVE EXAMPLE 3

An aqueous solution was prepared by mixing 0.30 mole of acryloyloxyethyltrimethylammonium chloride, 0.05 mole of methacryloyloxyethyltrimethylammonium chloride, 0.30 mole of acrylic acid, 0.35 mole of acrylamide, 0.30 mole of sodium chloride and 130 grams of water, followed by the same procedure as in Example 1, a powdery sludge dehydrating agent, hereafter called C-9, was obtained.

The sludge dehydrating agent obtained was evaluated by the same method as in Example 1. The results are tabulated in Table 1.

COMPARATIVE EXAMPLE 4

An aqueous solution was prepared by mixing 0.35 mole of methacryloyloxyethyltrimethylammonium chloride, 0.65 mole of acrylamide, 0.30 mole of calcium chloride and 130 grams of water, followed by the same procedure as in Example 1, a powdery sludge dehydrating agent, hereafter called C-10, was obtained.

The sludge dehydrating agent obtained was evaluated by the same method as in Example 1. The results are tabulated in Table 1.

TABLE 1

| Sludge Dehydrating Agent | After 3 Months | After 6 Months | After 9 Months |
|---|---|---|---|
| C-1 | ○ | ○ | ○ |
| C-2 | ○ | ○ | ○ |
| C-3 | ○ | ○ | ○ |
| C-4 | ○ | ○ | ○ |

TABLE 1-continued

| Sludge Dehydrating Agent | After 3 Months | After 6 Months | After 9 Months |
| --- | --- | --- | --- |
| C-5 | ○ | ○ | ○ |
| C-6 | ○ | ○ | ○ |
| C-7 | ○ | x | x |
| C-8 | x | x | x |
| C-9 | ○ | x | x |
| C-10 | ○ | ○ | x |

○: An aqueous solution forming a homogeneous liquid produced.
x: An aqueous solution containing an insoluble gel was produced.

As appearant from the results shown in Table 1, all of the sludge dehydrating agents of the invention, C-1~C-6, show no problem of insolubility by the deterioration during the storage time.

APPLICATION EXAMPLE 1

The sludge dehydrating agent(C-6) of Example 6 and the sludge dehydrating agent(C-10) of Comparative Example 4 were evaluated by the suction filter test and the squeeze test by using mixed sludge from a sewage disposal plant (pH5.6, suspended matter 1.9 wt/vol %). The procedure is as follows.

Into a 300 ml beaker was taken 200 ml of sludge, and then was added a required amount of a 0.3% by weight of an aqueous solution of sludge dehydrating agent, followed by stirring at 200 rpm for 30 seconds using a turbine impeller mixer, to be produced flocs of the sludge. The diameter of the flocs produced was then measured. Next, onto a suction filter covered with a nylon filter cloth was placed a cylindrical tube of 5 cm internal diameter, and then the flocculated sludge was poured into the tube, whereby the amount of the filtrate during 10 seconds was measured. Recovery of the suspended matter was calculated by measuring the amount of the suspended matter in the filtrate. Furthermore, a certain amount of the sludge filtered was sandwiched between two filter cloths for belting press, then squeezed at a pressure of 0.5 Kg/cm2 for 60 seconds, whereby the releasing ability from the filter cloth and the water content of the dehydrated cake were measured. The results of these tests are tabulated in Table 2.

TABLE 2

| Sludge Dehydrating Agent | C-6 | | | C-10 | | |
| --- | --- | --- | --- | --- | --- | --- |
| Amount: Added(ppm) | 100 | 130 | 160 | 100 | 130 | 160 |
| Floc Diameter(mm) | 3 | 5 | 6 | 3 | 4 | 5 |
| Amount of Filtrate during 10 sec(ml) | 120 | 142 | 148 | 88 | 102 | 120 |
| Recovery of Suspended Matter (%) | 99< | 99< | 99< | 89 | 92 | 94 |
| Release property from Filter Cloth | ○ | ○ | ○ | x | Δ | ○ |
| Water Content of Dehydrated Cake(%) | 78.5 | 76.8 | 76.2 | 83.1 | 81.8 | 80.1 |

○: Good
Δ: Poor
x: Bad

As appearent from the suction filter test and the squeeze test, the sludge dehydrating agent of the invention has a superior effect for the sludge dehydration as compared with the cationic polymer sludge dehydrating agents usually used for the sludge dehydration.

Industrial Applicabillity

The sludge dehydrating agent of the invention show no problem, unlike conventional sludge dehydrating agents, of insolubility by the deterioration, to be substantially unusable when stored for a long time, and hence it can be distributed in the market securely. The sludge dehydrating agent of the invention can be, therefore, used for the dehydration of the organic sludges including the live sludge such as sewage, excrement, factory waste water or the like, the activated excess sludge, the digested sludge, the flocculated sludge, or the mixed sludge thereof, which are discharged from sewage, excrement, factory waste water treatment plants or the like.

We claim:

1. A sludge dehydrating agent comprising a mixture of a copolymer composed of 10 to 60 mole % of cationic vinyl monomer units, 10 to 45 mole % of vinylic carboxylic acid monomer units and 5 to 80 mole % of nonionic vinyl monomer units with a mineral acid salt or an organic carboxylic acid salt of a group IIA metal of the periodic table, the molar ratio of said salt of a group IIA metal to the vinylic carboxylic acid monomer being in the range from 0.2 to 2.0, the molar ratio of the cationic vinyl monomer units to vinylic carboxylic acid monomer units being 0.3 to 3.0, based on the amount of the vinylic carboxylic acid monomer to the amount of the cationic vinyl monomer, and said agent having an improved storage stability imparted by the presence of said salt.

2. A sludge dehydrating agent of claim 1 wherein the cationic vinyl monomer is a compound expressed by the general formula (1).

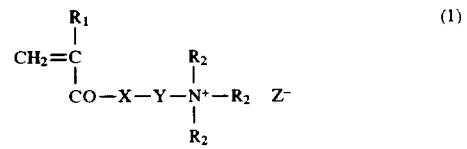

wherein $R_1$ denotes a hydrogen atom or a methyl group, $R_2$ denotes a hydrogen atom, a methyl group an ethyl group or a benzyl group, X denotes O or NH, Y denotes $CH_2 CH_2$, $CH_2 CH_2 CH_2$ or $CH_2 CH(OH)CH_2$, and Z denotes a chlorine atom, a bromine atom, an iodine atom, a sulfate group, or a methyl sulfate group.

3. A sludge dehydrating agent of claim 1 wherein the vinylic carboxylic acid monomer is acrylic acid, methacrylic acid or crotonic acid.

4. A sludge dehydrating agent of claim 1 wherein the nonionic-vinyl monomer is acrylamide or methacrylamide.

5. A sludge dehydrating agent of claim 1 wherein the salt of of a mineral acid is calcium chloride, magnesium chloride or magnesium sulfate.

6. A sludge dehydrating agent of claim 1, which is used in combination with an inorganic coagulant agent, the inorganic coagulant being added to the sludge either before or after said sludge dehydrating agent is applied to the sludge.

7. The sludge dehydrating agent according to claim 1 wherein said copolymer is amphoteric.

8. The sludge dehydrating agent according to claim 1 wherein said copolymer is formed from a mixture of acryoyloxyethyltrimethylammonium chloride, methacryoyloxyethyltrimethylammonium chloride, acrylic acid, acrylamide and calcium chloride.

9. The sludge dehydrating agent according to claim 1 wherein said copolymer is formed from a mixture of acryoyloxyethyltrimethylammonium chloride, acrylic acid acrylamide and calcium chloride.

10. The sludge dehydrating agent according to claim 1, wherein said copolymer is formed from a mixture of acryoyloxyethyltrimethylammonium chloride, methacryoyloxyethyltrimethylammonium chloride, acrylic acid, acrylamide and magnesium sulfate.

11. The sludge dehydrating agent according to claim 1, wherein said copolymer is formed from a mixture of methacryoyloxyethyltrimethylammonium methyl sulfate, acrylic acid, acrylamide and calcium chloride.

12. The sludge dehydrating agent according to claim 1, wherein said copolymer is formed by polymerization of an aqueous solution of a cationic vinyl monomer, a vinylic carboxylic acid monomer and a nonionic vinyl monomer, said solution containing added thereto said salt of a group IIA metal.

13. The sludge dehydrating agent according to claim 1, wherein said copolymer is formed by polymerization of an aqueous solution of a cationic vinyl monomer, a vinylic carboxylic acid monomer and a nonionic vinyl monomer, into which solution is admixed a salt of a group IIA metal while the polymerization is proceeding.

14. The sludge dehydrating agent according to claim 1, which is powdery.

15. A process for improving storage stability of a sludge dehydrating agent, which comprises admixing a copolymer composed of 10 to 60 mole % of cationic vinyl monomer units, 10 to 45 mole % of vinylic carboxylic acid monomer units and 5 to 80 mole % of nonionic vinyl monomer units with a mineral acid salt of a group IIA metal of the periodic table or an organic carboxylic acid salt of a group IIA metal of the periodic table; the molar ratio of said salt of a group IIA metal to the vinylic carboxylic acid monomer being in the range from 0.2 to 2.0; the molar ratio of the vinylic carboxylic acid monomer to the cationic vinyl monomer in said copolymer being in the range from 0.3 to 3.0; said salt of a group IIA metal being added to the monomers, while the polymerization of the monomers is proceeding or after the polymerization.

16. A sludge dehydrating agent comprising a mixture of a copolymer composed of 10 to 60 mole % of cationic vinyl monomer units, 10 to 45 mole % of vinylic carboxylic acid monomer units and 5 to 80 mole % of nonionic vinyl monomer units with a mineral acid salt or an organic carboxylic acid salt of a group IIA metal of the periodic table, the molar ratio of said salt of a group IIA metal to the vinylic carboxylic acid monomer being in the range from 0.2 to 2.0, the molar ratio of the cationic vinyl monomer units to vinylic carboxylic acid monomer units being 0.3 to 3.0, based on the amount of the vinylic carboxylic acid monomer to the amount of the cationic vinyl monomer, and said agent having an improved storage stability imparted by the presence of said salt; and wherein said copolymer is formed from a mixture of acryoyloxyethyltrimethylammoniumchloride, acrylamidepropyltrimethylammonium chloride, acrylic acid, acrylamide and calcium chloride.

* * * * *